US012565345B1

(12) United States Patent
Liska et al.

(10) Patent No.: US 12,565,345 B1
(45) Date of Patent: Mar. 3, 2026

(54) AUTOMATED DRONE STORAGE AND LAUNCH APPARATUS, SYSTEM, AND METHOD

(71) Applicants: Antonio Liska, Cedar Hill, TX (US);
Keith T. Strang, Zimmerman, MN (US)

(72) Inventors: Antonio Liska, Cedar Hill, TX (US);
Keith T. Strang, Zimmerman, MN (US)

( * ) Notice: Subject to any disclaimer, the term of this patent is extended or adjusted under 35 U.S.C. 154(b) by 0 days.

(21) Appl. No.: 18/676,491

(22) Filed: May 28, 2024

Related U.S. Application Data

(60) Provisional application No. 63/504,751, filed on May 28, 2023.

(51) Int. Cl.
B64U 80/40 (2023.01)
B64U 80/25 (2023.01)

(52) U.S. Cl.
CPC .............. B64U 80/40 (2023.01); B64U 80/25 (2023.01)

(58) Field of Classification Search
CPC ................................................... B64U 80/40
See application file for complete search history.

(56) References Cited

U.S. PATENT DOCUMENTS

| | | | |
|---|---|---|---|
| 5,109,788 A | 5/1992 | Heinzmann | |
| 9,387,940 B2 | 7/2016 | Godzdanker | |
| 9,623,760 B2 | 4/2017 | Wang et al. | |
| 9,630,517 B2 | 4/2017 | Lee et al. | |
| 9,701,425 B2 | 7/2017 | Lee et al. | |
| 9,764,833 B1 | 9/2017 | Tighe et al. | |
| 9,828,093 B2 | 11/2017 | Raniere | |
| 9,845,165 B2 * | 12/2017 | Michalski | B64U 70/90 |
| 9,957,045 B1 | 5/2018 | Daly | |
| 9,963,229 B2 | 5/2018 | Welker et al. | |
| 10,287,034 B2 | 5/2019 | Mozer | |
| 10,322,820 B2 | 6/2019 | Husain et al. | |

(Continued)

FOREIGN PATENT DOCUMENTS

| | | | |
|---|---|---|---|
| CN | 118025540 A | * | 5/2024 |
| CN | 118220570 A | * | 6/2024 |

(Continued)

OTHER PUBLICATIONS

Foreign Refrerence (Year: 2023).*

*Primary Examiner* — Justin M Benedik
(74) *Attorney, Agent, or Firm* — Albert W. Watkins

(57) ABSTRACT

At least two drone stacks are axially offset from each other, the axes displaced from each other in such a manner that the drone arms and propellers are interspersed. A variety of offset stacking arrangements are illustrated that increase the density of the stack and provide space for a payload. With proper geometry and motor control, the propellers are configured to be electrically folded in. In addition, the offset stack is configured to enable drones to automatically launch sequentially from and automatically return to the stack when using appropriate location determination apparatus. Ventilation pathways are provided within each drone that enhance the cooling of the drones while in the stack. The stacks are configured for use within or separate from a storage and charging case. The relevant apparatus, systems, and methods are each disclosed.

5 Claims, 7 Drawing Sheets

(56) References Cited

U.S. PATENT DOCUMENTS

| | | | |
|---|---|---|---|
| 10,370,122 B2 | 8/2019 | Fisher et al. | |
| 10,577,126 B2 | 3/2020 | Mozer | |
| 10,694,155 B2 | 6/2020 | Raffa et al. | |
| 10,800,524 B2 * | 10/2020 | Benezra | B64U 80/70 |
| 10,899,445 B2 | 1/2021 | Augugliaro et al. | |
| 10,904,807 B2 | 1/2021 | Kaneda et al. | |
| 10,934,019 B2 | 3/2021 | Stamatovski | |
| 10,953,999 B2 | 3/2021 | Alcorn et al. | |
| 10,981,672 B2 | 4/2021 | Achtelik et al. | |
| 11,190,032 B2 | 11/2021 | Farrahi et al. | |
| 11,383,835 B2 | 7/2022 | Hortner et al. | |
| 11,597,516 B1 * | 3/2023 | Klinkmueller | B64U 70/20 |
| 11,603,192 B2 | 3/2023 | Jung et al. | |
| 11,634,219 B2 * | 4/2023 | Rowse | B64C 37/02 |
| | | | 244/2 |
| 2017/0050749 A1 | 2/2017 | Pilskalns | |
| 2017/0072812 A1 | 3/2017 | Von Novak et al. | |
| 2017/0297445 A1 | 10/2017 | Zheng et al. | |
| 2018/0074486 A1 | 3/2018 | Krishnamoorthy et al. | |
| 2018/0170191 A1 | 6/2018 | Xing et al. | |
| 2018/0237161 A1 | 8/2018 | Minnick et al. | |
| 2019/0002127 A1 | 1/2019 | Straus et al. | |
| 2019/0016476 A1 * | 1/2019 | Scherz | H02J 7/0042 |
| 2019/0023416 A1 | 1/2019 | Borko et al. | |
| 2019/0077519 A1 * | 3/2019 | Husain | B64F 1/222 |
| 2019/0176986 A1 | 6/2019 | Addonisio et al. | |
| 2019/0344888 A1 | 11/2019 | Ben-David et al. | |
| 2019/0383052 A1 | 12/2019 | Blake et al. | |
| 2020/0010200 A1 | 1/2020 | Chen et al. | |
| 2020/0225684 A1 | 7/2020 | Anderson et al. | |
| 2020/0317318 A1 | 10/2020 | Wu et al. | |
| 2021/0049722 A1 | 2/2021 | Farris et al. | |
| 2021/0107648 A1 | 4/2021 | Augugliaro et al. | |
| 2021/0171218 A1 | 6/2021 | Scherz | |
| 2022/0009647 A1 | 1/2022 | Johannesson et al. | |
| 2023/0002082 A1 | 1/2023 | Shuff | |
| 2023/0348067 A1 | 11/2023 | Fliszar et al. | |
| 2024/0067371 A1 * | 2/2024 | Turner | B64U 50/37 |

FOREIGN PATENT DOCUMENTS

| | | | | |
|---|---|---|---|---|
| CN | 204068303 U | 12/2024 | | |
| EP | 1767453 B1 | 6/2008 | | |
| EP | 3177528 B1 | 4/2019 | | |
| JP | 6538214 B2 | 6/2018 | | |
| KR | 101792555 B1 | 5/2017 | | |
| KR | 102263704 B1 | 6/2021 | | |
| KR | 102357302 B1 | 2/2022 | | |
| PA | 3487760 B1 | 7/2021 | | |
| WO | WO 2016/130112 A1 | 8/2016 | | |
| WO | WO-2018195574 A1 * | 11/2018 | | B60H 1/32281 |
| WO | WO 2022/249176 A2 | 12/2022 | | |
| WO | WO-2023272600 A1 * | 1/2023 | | B60L 53/14 |

* cited by examiner

AUTOMATED DRONE STORAGE AND LAUNCH APPARATUS, SYSTEM, AND METHOD

CROSS REFERENCE TO RELATED APPLICATIONS

The present application claims the benefit of U.S. provisional patent application 63/504,751 filed May 28, 2023 of like title and inventorship, the teachings and entire contents which are incorporated herein by reference.

BACKGROUND OF THE INVENTION

1. Field of the Invention

The present invention pertains generally to Unmanned Aerial Vehicles (UAVs). While the term "drone" is used herein below, the word "drone" will be understood herein to refer to a variety of UAVs. The four propeller "quad-copter" is used as the most exemplary type of UAV described herein below in the preferred and alternative embodiments. Nevertheless, there are a myriad of other types of UAVs to which the present invention will be applicable, not only varied by the number of propellors but also by the body geometries and flying techniques and apparatus. Consequently, for the purpose of the present specification the word "drone" will be understood to encompass that myriad of other types of UAVs wherever the teachings introduced herein will find suitable application. In one particular manifestation, the present invention pertains to a drone storage and launch apparatus. In another more particular manifestation, the present invention pertains to a drone storage and launch system. In yet another more particular manifestation, the present invention pertains to a drone storage and launch method.

2. Description of the Related Art

With the advent of drone light shows and similar swarm or multi-drone deployments, managing large numbers of drones has heretofore been very labor-intensive. It is now becoming common to fly tens, hundreds or even thousands of drones at a time. For exemplary purpose, in the prior art when a person wishes to perform a multi-drone deployment, the tasks include: charging batteries, unpacking the drones, installing the batteries into the drone, measuring a drone takeoff grid, placing drones at precise locations on the takeoff grid, and powering them on, all before they can perform the relatively easy task of automated flight. Multiply these tasks by 100 or 1000 and it becomes apparent that without large numbers of human laborers, setting up for this type of deployment requires a multi-day effort. A common ratio is to allocate one person for every twenty-five drones. As may be appreciated then, the thousand drone deployments have heretofore required large crews of more than three dozen people.

In order to deploy and safely maneuver a large number of drones, a precise navigational system is required. One approach used and illustrated by skilled artisans is a Real-Time Kinematics (RTK) that is incorporated into a GPS, GNSS, or equivalent or alternative location determination systems. Another approach is the use of a Differential GPS (DGPS) system and apparatus. Exemplary U.S. (where no country code is provided) and Foreign patents and published applications, the teachings which are incorporated herein by reference, include: 9,701,425; 10,694,155; 10,904,807; 2020/0317318; KR102263704B1; and KR102357302B1.

Battery charging, which in the prior art typically requires battery removal, is typically started days before a show or deployment. This too is determined by the space and charging equipment on hand to accommodate the batteries removed from the drones, and on the available labor pool. Again, in the thousand drone deployment, the counter space required to charge these batteries is prohibitive, and the battery removal, reinsertion, connecting, and powering of each drone is very time consuming. Consequently, some subset of the total batteries will normally be charged at a time, and each subset will normally require much manual effort and hours of charging.

Each battery removal, placement at a charge station or counter, and reinsertion represent high-risk events for accidents that can damage either the battery or the drone. As may be appreciated, both the battery and the drone are designed to be extremely light-weight, and so both are difficult to design in a way that is both light weight and yet sufficiently durable to withstand the occasional misalignment or dropping that will occur during the aforementioned removal, charging, and reinsertion of the batteries. Furthermore, traveling with a fully charged battery is, in some jurisdictions and with some carriers, prohibited due to the significant risk for serious damage that can occur in the event of a catastrophic battery failure or accidental short circuit, due to the high energy density of modern batteries.

When transporting the drones, the drones are normally inserted into a pack or case. Most prior art drone packs provide excellent cushioning and containment of individual drones, but at the price of very large containers, each which must be handled multiple times to insert, transport, and remove the individual drones. Even when space is not critical, the necessary handling of each container to access only a few drones is highly inefficient. Consider the extreme case where only one drone is packed in one container. The insertion and removal of the individual drones will take substantially longer than even when a two-drone container is used, since the one-drone case must be positioned in a worker's space, opened to insert and remove the drone, and then the case removed from the worker's work space with each drone. This can require as much or even more handling than required for the drone. Clearly, and most preferably, a tighter package density not only reduces the space required for storage and transport, but also increases the efficiency of storing, accessing, handling, and working with the drones.

Nevertheless, another issue with many types of drones arises with the relatively fragile propeller blades. Fixed propeller blades are particularly easily damaged, since they have no ability to collapse in any direction on impact. Exemplary folding propellers in the prior art are divided into two unidirectional blades, each that are anchored through a freely-spinning pintle just off-center on the rotor. When the rotor spins, centrifugal force drives the pair of unidirectional props out into a co-axial flight position. When power is not applied, these propellers tend to swivel freely about their access of rotation, which can be beneficial if they are struck or collided with another object. Unfortunately, this also means that, when moving stacks of drones around, placing them into cases and what not, the first thing a person must do is fold all of the folding props in. Folding the props in when not in use is better for safety, helps the props last longer in case of prop strikes, and so forth, so they don't catch on anything, and ultimately take up less space. As can be appreciated from this illustration, the props take up much less space and are much less likely to be damaged. Nevertheless, in the prior art this folding is done manually, pivoting each blade into position. However, since each unidirectional blade spins freely on the associated rotor-mounted pintle, even a slight tilt or bump of the drone can once more randomly orient the props. One particular skilled artisan has proposed a controlled folding propeller in U.S. Pat. No. 11,603,192, the teachings which are incorporated herein by reference.

In order to reduce the amount of manual handling required, various skilled artisans have proposed apparatus, systems, and methods that are used to automatically deploy and dock drones. Exemplary U.S. (where no country code is provided) and Foreign patents and published applications, the teachings which are incorporated herein by reference, include: 10,577,126; 2017/0297445; 2019/0344888; 2021/0107648; 2021/0171218; CN110100367B; and EP3177528B1. While offering an improvement over the prior art, these approaches still suffer from the defects of the prior art described herein above, including fragile propellers remaining exposed and pivoting about, relatively low packaging density, and still substantial manual handling in preparation for a show or other large deployment.

Some skilled artisans have also proposed drone stacks that facilitate charging and/or communications through the stack. Exemplary U.S. patents, the teachings which are incorporated herein by reference, include: 10,322,820; 10,370,122; 10,981,672; and 11,634,219.

One of the challenges created by a more tightly packed stack is that the charging generates a significant amount of heat. As the density of the stack increases, this waste heat will either damage the batteries, to the point of creating a serious fire hazard, or a battery charge controller must be provided that will slow the charging to keep the temperature to a safe maximum. To facilitate both charging and better battery performance, at least one artisan has proposed a cooled housing that drones are stored in, in US published application 2019/0383052, the teachings which are incorporated herein by reference. Unfortunately, as the density of a drone stack increases, this cooled housing fails to adequately cool the drones in the stack.

To cool drones and other aircraft in flight, when substantial energy may be consumed and in environments that are not temperature controlled, some skilled artisans have designed air flow systems that are configured to force or draw air across internal heat-generating components. Exemplary US patents and published applications, the teachings which are incorporated herein by reference, include: 9,764,833; 2020/0010200; 2022/0009647; and 2023/0348067. Nevertheless, these are configured for actual flight for operation, and do not contemplate the cooling of densely packed stacks of drones.

Some particularly skilled artisans have devised various apparatus, systems, and methods that address several of the aforementioned defects of the prior art. Exemplary U.S. patents and published applications, the teachings which are incorporated herein by reference, include: 9,957,045; 10,800,524; 10,899,445; 11,383,835; 2019/0383052; and 2023/0002082.

Additional U.S. (where no country code is provided) and Foreign patents and published applications of varying relevance, the relevant teachings and contents which are incorporated herein by reference, include: U.S. Pat. Nos. 9,387,940; 9,623,760; 9,828,093; 9,963,229; 10,287,034; 10,934,019; 10,953,999; 2017/0050749; 2018/0074486; 2018/0170191; 2018/0237161; 2019/0002127; 2019/0023416; 2019/0176986; 2020/0225684; 2021/0049722; CN108367685A; CN109733629B; CN204068303U; DE102015116118B4; EP1767453B1; EP3487760B1;

JP6538214B2; KR101571161B1; KR101792555B1; WO2016130112A1; and WO2022249176A2.

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements and substantial research and development that has been conducted, there still remains a need for optimizing and automating these processes required to prepare a large volume of drones for a show or other deployment. Well conceived automation can provide a significant reduction in labor required while also increasing reliability. This in turn helps in making drone light shows and other multi-drone deployments more affordable and accessible to a wider part of the population. A key concept in this novel design is force multiplying. With the same amount of work it took an operator to deploy one drone in the prior art, in accord with the present teachings the operator can now deploy dozens.

SUMMARY OF THE INVENTION

In a first manifestation, the invention is an automatic drone storage and launch apparatus as shown, described and which may be imputed by those skilled in the art.

In a second manifestation, the invention is an automatic drone storage and launch system as shown, described and which may be imputed by those skilled in the art.

In a third manifestation, the invention is a method of autonomously storing, deploying, and docking drones as shown, described and which may be imputed by those skilled in the art.

OBJECTS OF THE INVENTION

Exemplary embodiments of the present invention solve inadequacies of the prior art by providing extremely densely packed drone stacks that are configured with at least two stacks that are axially offset from each other, the axes that are typically vertical and displaced from each other in such a manner that the drone arms and propellers are interspersed. By arranging the drones in this manner, not only is the density of the stack increased, space is also provided for a payload, and, with proper geometry, the propellers are configured to be electrically folded in. In addition, the offset stack is configured to enable the drones to be automatically launched sequentially from and automatically returned to the stack. Special ventilation pathways are provided that enhance the cooling of the drones while in the stack, thereby greatly facilitating both high packing density and increasing component life expectancy, and also enabling more rapid charging.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an automated drone storage and launch apparatus that allows the apparatus to be handled as a single unit irrespective of the number of drones contained therein. A second object of the invention is to provide a drone stack that has interspersed drones along at least two parallel and offset axes to provide high packing density. Another object of the present invention is to provide propellers that are configured to be electrically folded into precise position within the stack, rather than extending randomly therefrom. A further object of the invention is to enable the drones to be automatically launched sequentially from and automatically returned to the stack. Yet another object of the present invention is to provide explicit ventilation pathways that enhance the cooling of the drones while in the stack.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 7:
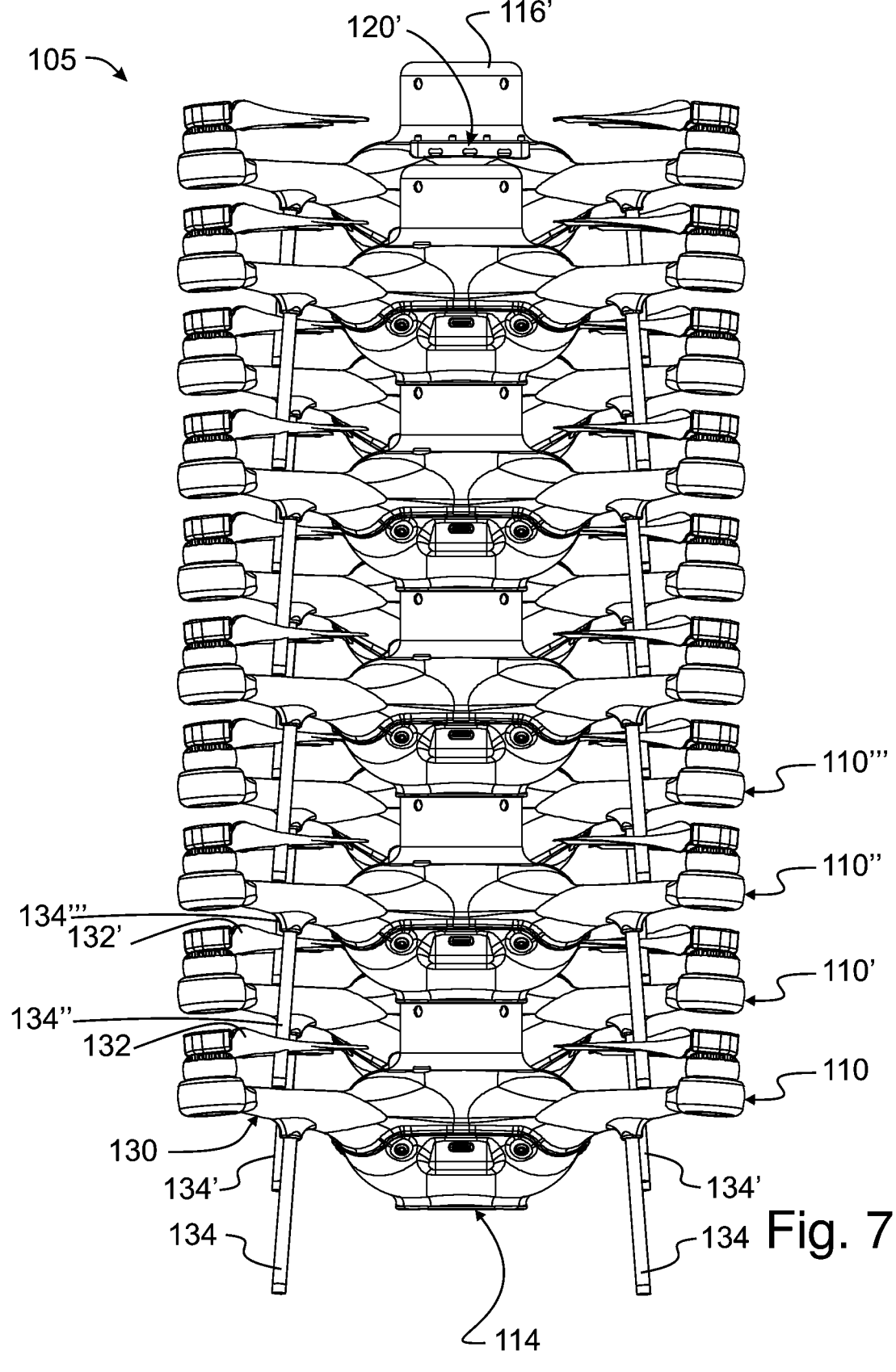
Figure 8:
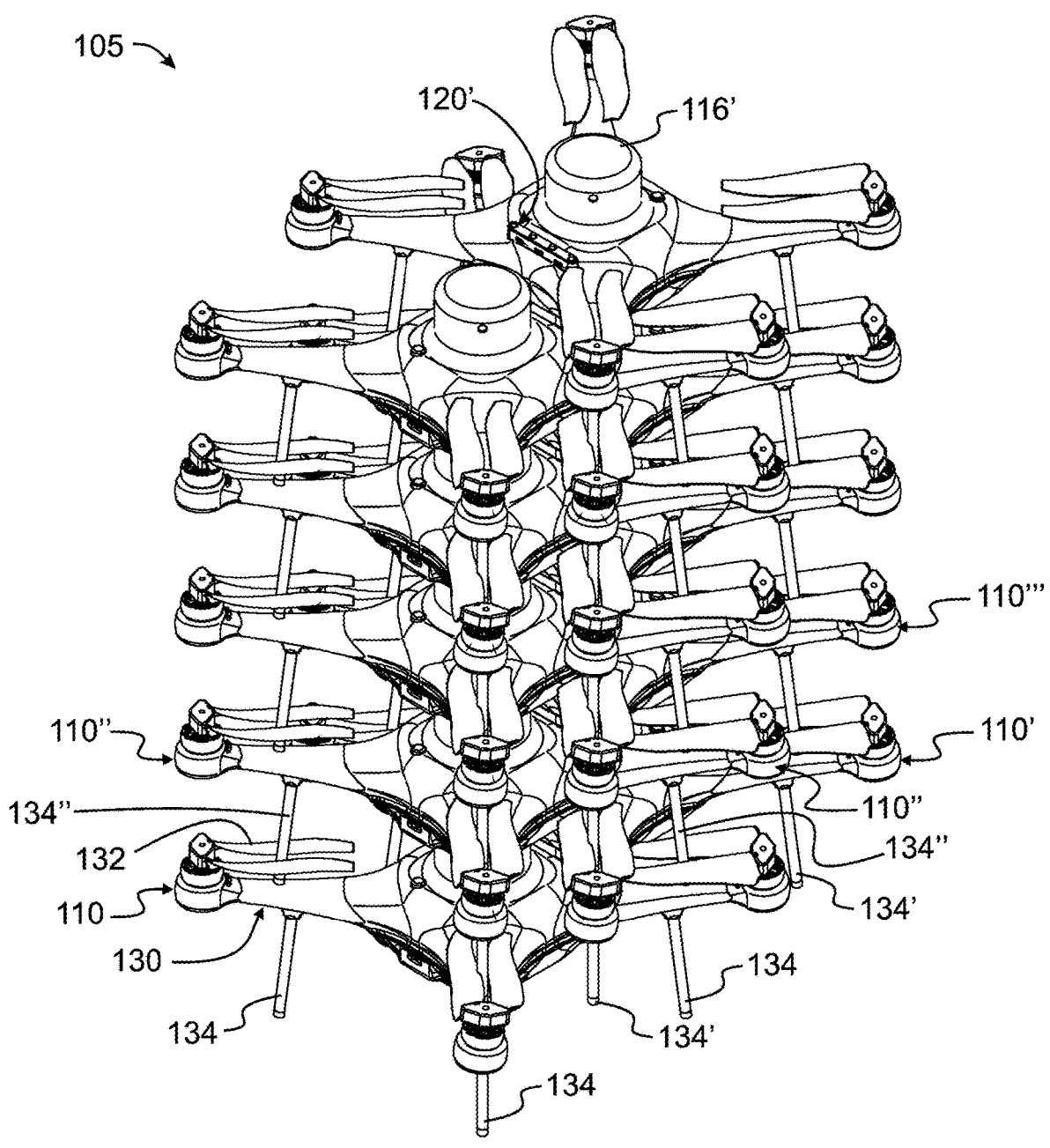
Figure 9:
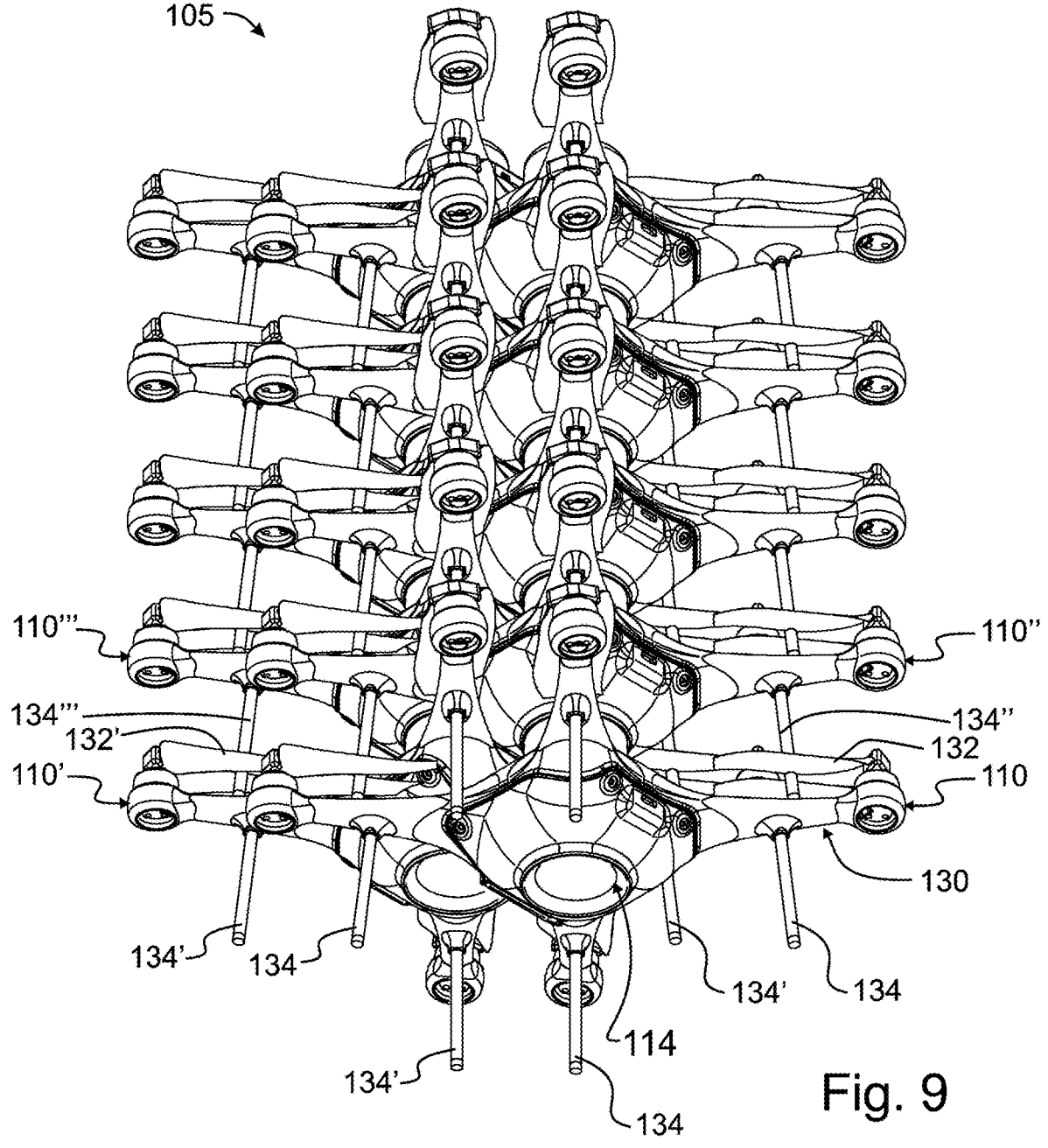

Manifested in the preferred embodiment, the present invention provides a single drone 110 that can be replicated and which is configure to be stacked and launched from the stack automatically. Preferred embodiment drone 110 comprises an exterior shell 112 that defines a cup-shaped base 114, and a hat shaped drone core cap 116. Preferably, when cup-shaped base 114 is lowered onto a hat shaped drone core cap 116 of a vertically displaced like drone 110, the two will nest together, such as best illustrated in FIG. 7. With suitable geometry, this nesting will further accommodate slight positional mismatches therebetween, and so will guide vertically displaced drones into coaxial alignment. Cup-shaped base 114 might, for exemplary and non-limiting purpose, also house one or more illumination sources when so desired.

Preferred embodiment through-stack electrical connectors 120 provide electrical connection from the bottom surface of drone 110 to a top surface thereof, and are most preferably configured to thereby couple with adjacent drones and a suitable powered base or storage case. Again most preferably, but not essential to the present invention, a combination of charging power and communications are carried by through-stack electrical connectors 120, ensuring easy control and monitoring of a stack of like drones 110.

Preferred embodiment drone 110 is shown for exemplar purpose as comprising four drone arms 130 arranged radially extending at equal angular displacements from the vertical center axis of drone 110. While preferred for various reasons, the number and orientation of drone arms 130 is not critical to most features of the present invention. Consequently, in some alternative embodiments fewer or more arms 130 will be provided, and the angular spacing of such arms will in some embodiments deviate from equal angular displacements. Along arms 130, and preferably terminating them as illustrated, there are propeller blades 132 that are most preferably selectively driven by electric motor as is known in the drone art. Extending from the bottom side of drone 110, and as illustrated with one per arm 130, are legs 134 that serve as a stand when preferred embodiment drone 110 is resting upon a surface.

Figures 1, 2, 3, 4, 5:
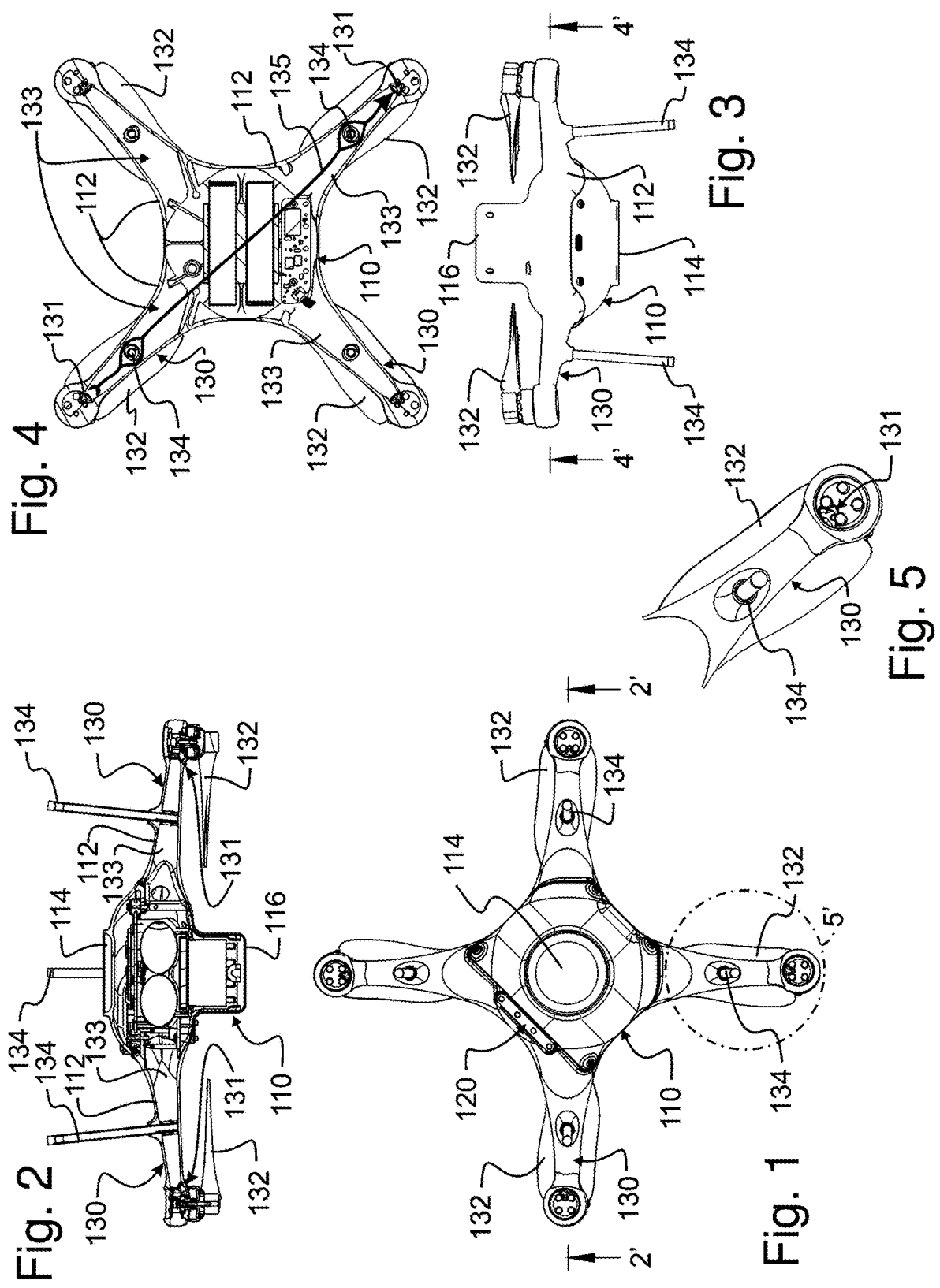
FIG. 1 illustrates a preferred embodiment drone designed in accord with the teachings of the present invention from a bottom plan view.
FIG. 2 illustrates the preferred embodiment drone of FIG. 1 from a vertical plane sectional view taken along section line 2' of FIG. 1.
FIG. 3 illustrates the preferred embodiment drone of FIG. 1 from an elevational view.
FIG. 4 illustrates the preferred embodiment drone of FIG. 1 from a horizontal plane sectional view taken along section line 4' of FIG. 3.
FIG. 5 illustrates an enlarged arm terminus and air vent incorporated into the preferred embodiment drone of FIG. 1 from an enlarged view circumscribed by line 5' of FIG. 1.
Figure 6:
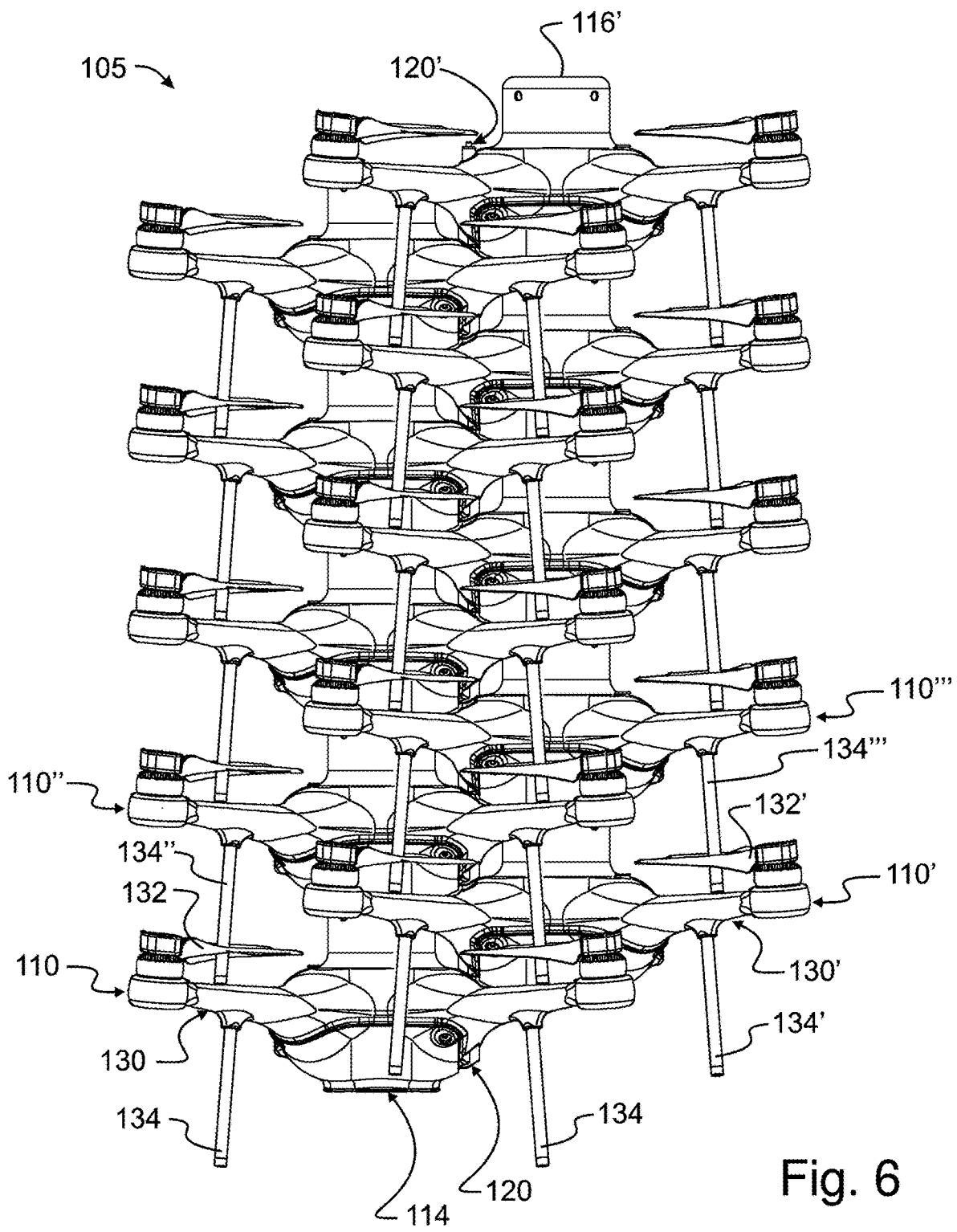
FIGS. 6-10 illustrate a preferred embodiment drone stack from side elevational, end elevational, top isometric, bottom isometric, and top plan views, respectively.

Also positioned along one or more arms 130 and as illustrated adjacent to the propeller blades 132, there is at least one air vent 131 that allows for an exchange of air from an interior of shell 112 to an exterior thereof and vice-versa. Within the interior of shell 112 there is formed at least one and for exemplary purposes a plurality of interconnected air chambers 133. Preferred air flow from an exterior of shell 112 through air vents 131 and air chambers 133 is illustrated for exemplary and non-limiting purpose by air flow arrow 135. Air flow arrow 135 illustrates one exemplary air flow path through preferred embodiment drone 110, branching around each leg 134, and potentially traversing from one arm through the central portion of drone 110, and then subsequently exiting out a distal air vent 131 or equivalent. While in the preferred embodiment as illustrated the air flow path extends from one air vent 131 to another, in alternative embodiments other air vents are provided on different parts of shell 112 to facilitate cooling. For exemplary and non-limiting purpose, the two circles adjacent to the top of hat shaped drone core cap 116 in FIG. 3 will in some embodiments represent air vents through which air can pass to cool the interior of shell 112.

In accord with the teachings of the present invention, a case is provided of cuboid or other geometry and having a dimension such as a width and a depth sufficient to accommodate a plurality of drones in at least two axially offset stacks, such as illustrated in FIGS. 6-11. When so arranged, in accord with the teachings of the present invention, a climate controller such as illustrated in the prior art patent 2019/0383052 by Blake et al will be directed toward at least one air vent 131, such that the air from the climate controller will be directed consequentially through the associated air vent to thereby more efficiently control the temperature inside of shell 112 as desired.

As particularly evident in FIGS. 6-9, in a preferred embodiment drone stack 105 legs 134 provide a natural stop for propeller blades 132. Because of the speed controllers used in the present invention and the fine control they offer, in some embodiments the operator will rotate the motors just enough to fold the props against adjacent legs 134 in the stack. While other drone parts may be provided for this purpose, legs 134 serve an excellent dual purpose, since they necessarily extend from the shell 112 to an underlying support. This electrical propeller rotation saves an operator time preparing each stack. Furthermore, in some embodiments a button is provided on the drones, so that for exemplary and non-limiting purpose a button on the top drone can be pressed by a person, and each drone will rotate motors in a gentle and controlled manner to spin the blades into retracted position such as shown in FIGS. 6-11. In some embodiments, this blade retraction sequence is triggered remotely such as through a radio signal communication. In other embodiments, the blade retraction sequence is triggered by sensors within drone 110 detecting placement within a stack that allows the blade retraction sequence to be effected.

Figure 10:
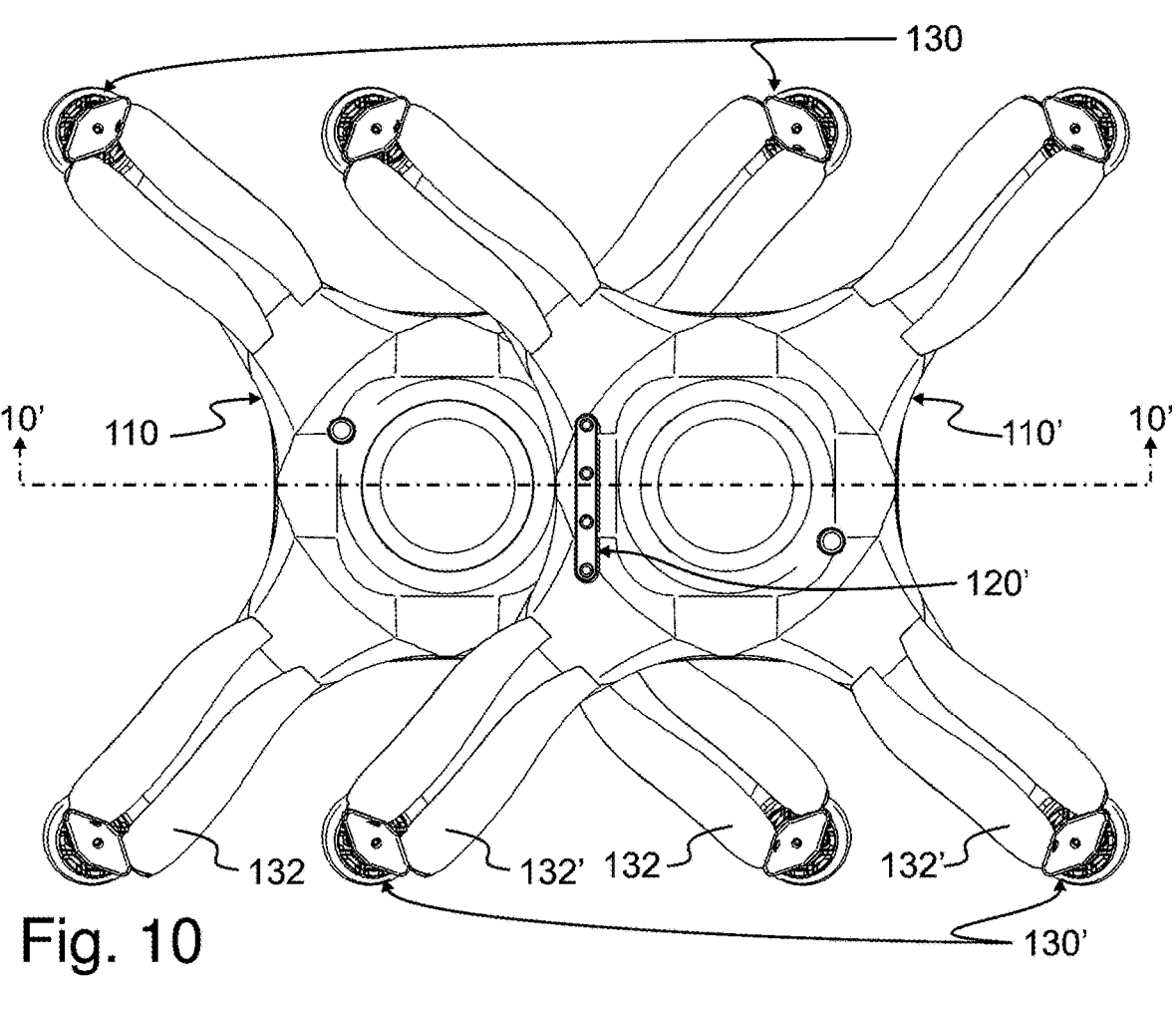
Figure 11:
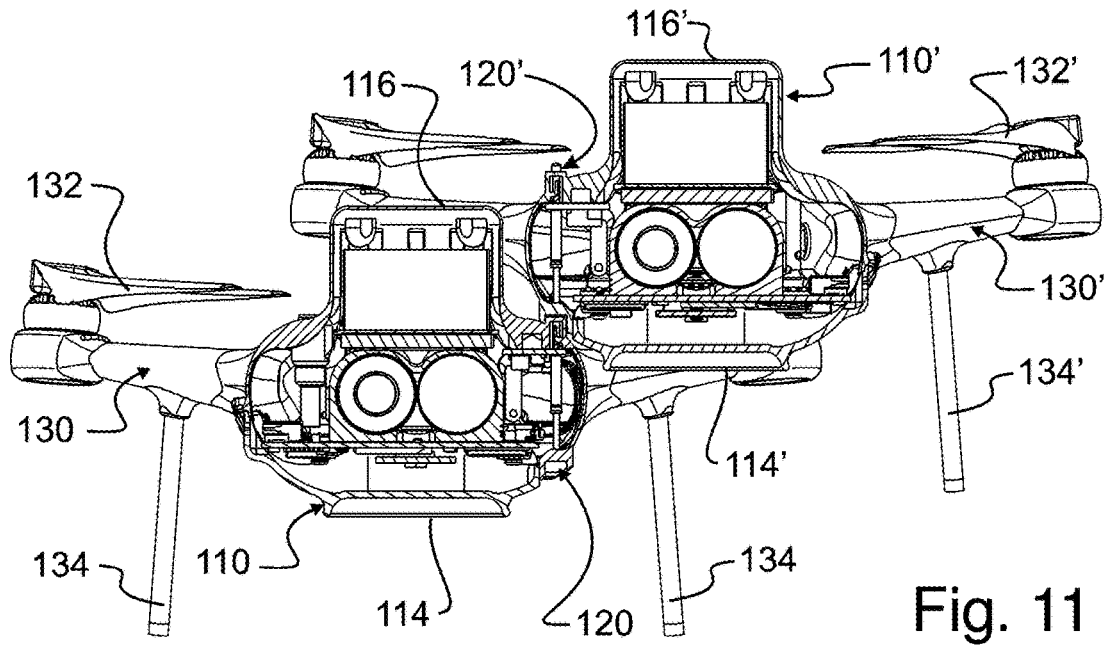
FIG. 11 illustrates a simplified two drone stack designed in accord with the teachings of the present invention from a vertical plane sectional view taken along section line 10' in FIG. 10.

In these views of FIGS. 6-10, and particularly in FIG. 10, it is apparent that the two stacks are defined by horizontally offset vertically extending axes. Drones aligned with one vertical axis, such as drones 110 and 110", will have their through-stack electrical connectors 120 oriented in one direction, such as the three o'clock position as illustrated in FIG. 10. In contrast, drones aligned with the adjacent vertical axis, such as drones 110' and 110", will instead have their through-stack electrical connectors 120 oriented in a second direction opposed to those of the adjacent stack, such as the nine o'clock position as illustrated in FIG. 10. In this way, through-stack electrical connectors 120 will provide electrical connection through both stacks simultaneously.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 12:
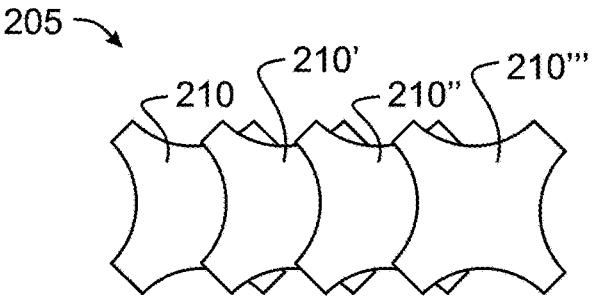
FIGS. 12-15 illustrate various alternative embodiment offset axis stacking arrangements designed in accord with the teachings of the present invention from simplified top plan view.
Figure 13:
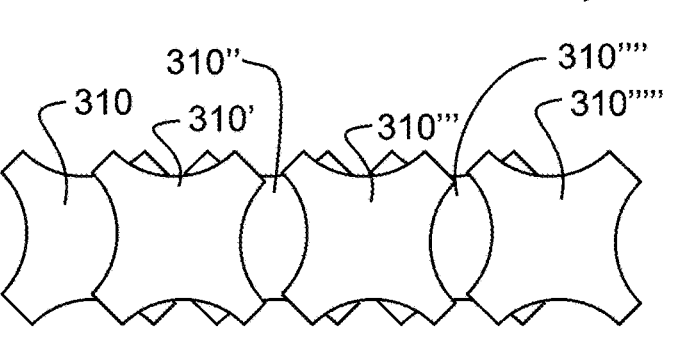
Figure 14:
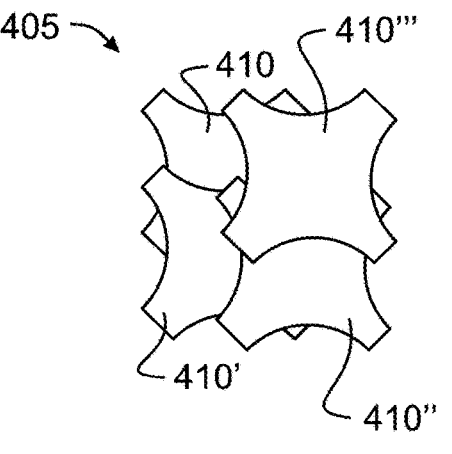
Figure 15:
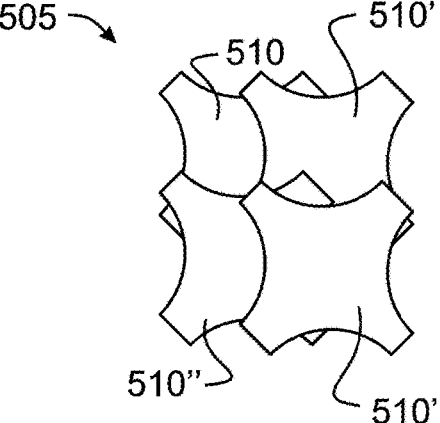

While the two parallel and offset stack vertical axes of FIGS. 6-10 is most preferred, FIGS. 12-15 illustrate by simplified schematic drawings four alternative embodiment arrangements for providing offset vertical axes that provide interspersing of drones from one axis with another to gain maximum stacking density. In FIG. 12, drone stack 205 has drones 210 that are offset from each other in a stair-like pattern. There are four vertical axes illustrated therein, but as will be apparent, any number of axes greater than one that are generally parallel and offset from each other may be used. In FIG. 13, drone stack 305 has drones 310 that are offset from each other in five parallel and offset axes, with alternating layers of three drones shifted with the next level above and below. Again, there are six vertical axes illustrated therein, but as will be apparent, any number of axes greater than one that are generally parallel and offset from each other may be used. In FIG. 14, drone stack 405 has drones 410 that are offset from each other in four parallel and offset axes, defining a vertical helix of drones. While there are four vertical axes illustrated therein, any number of axes greater than two that are generally parallel and offset from each other may be used to define a generally helical arrangement. In FIG. 15, drone stack 505 has drones 510 that are offset from each other in four parallel and offset axes, but climbing in a back and forth stair stepping manner as illustrated.

As may be appreciated, the geometry of drones 110-510 is most preferably engineered to facilitate the interspersing to form a dense stack. As noted herein above, an offset stack provides high storage density by allowing the propeller arms to overlap and intersperse with neighboring drone, making better use of storage volume. In some embodiments, additional or intrinsic impact and vibration dampening protection is built into one or more of the mounting base, hat shaped drone core cap 116, and cup-shaped base 114, configuring them so that the plurality of drones 110 within drone stack 105 act as one unit. In some embodiments this can eliminate the need for dunnage between individual drones. Not only does the integrated shape of the drone help to maximize storage density, it also helps in hand-transporting multiple drones at a time. Since the drones lock together, two hands can carry a stack of drones instead of having to rely on special stands or having to hook a finger around each drone being carried.

An automated drone storage and launch apparatus, system, and method designed in accord with the teachings of the present invention offers a number of features and benefits.

Charging through the through-stack electrical connectors 120 provides an integrated way to charge multiple drones in parallel, without having to swap batteries. Through-stack electrical connectors 120 are preferably configured to align within drone stack 105 automatically, not by using manual plugs. These could be spring contacts, blade contacts, surface contacts, or other suitable electrical connectors.

Preferably, each drone 110 is provided with an on-board charging system that includes batteries and integrated charge controllers. In lieu of a centralized charge controller that can charge a few batteries at a time, each drone 110 is preferably provided with a charge controller. This allows for safe, controlled charging of each battery, including life cycle history of individual batteries to evaluate long-term health. Integrated batteries also means easier air transport as the batteries are integrated into the product and do not need to be removed for commercial flights.

The integrated through-stack electrical connectors 120 can also be used to provide pulses or communications signals as desired, for exemplary and non-limiting purpose to include pyro charges and other special applications. For those applications that require some level of security or the eventual removal of buttons on the drones to save on complexity, in some embodiments the through-stack electrical connectors 120 can act as a power switch by using a special "key" to contact the power pins and power on the drone. In some embodiments this will also serve as the backup to remote-power on via independent radio if a hard reset or power on and off is ever needed.

In some embodiments, through-stack electrical connectors 120 may be non-linear or indirectly coupled through intervening circuitry or components. In some embodiments, through-stack electrical connectors 120 may electrically couple through circuitry within drone 110 that enable added functionality of contacts, for exemplary and non-limiting purpose such as to provide top-down power on signal, general IO, PWM input/output, etc. In some embodiments the circuitry is configured to allow signal current to flow unidirectionally one way and charge current to flow unidirectionally the other way. In such embodiments, diodes and opto-isolators may be used to limit flow of signal current from the top down and charging current from the bottom up. In some embodiments, active switching will be used either separately or in combination with other directional control.

In the preferred embodiment drone 110 as illustrated, through-stack electrical connectors 120 include two ground pins and two power pins, which is used to spread the current and heat. In some embodiments alternate contacts are added for dedicated signal lines, instead of using the charging contacts for multi-purpose application.

In a preferred combination drone stack and case, a cooling system is preferably built into the storage/charging case to provide safe and reliable charging. In some embodiments, the cooling system is built into drone 110, and in some of these embodiments drone propeller blades 132 are activated to create airflow for charging. In some embodiments, integrated fans and/or heat syncs are provided. Building the cooling system into the charging base or case can help to alleviate the weight load of integrated cooling systems on drones 110. Preferably, the integrated charge controllers will automatically slow down or stop charging if too much heat is detected. Heat is a major restrictor to timely charging. To optimize air cooling, an air cooling channel has been created within each drone. In some alternative embodiments, the geometry of shell 112 will form an air channel, or in alternative embodiments a separate air channel within the case couples with a drone stack 105 and directs airflow around the critical cooling areas. This is possible due to the precise stacking of drones 110. Identical holes in the stack will all line up to create a channel. Most preferably, when forced air cooling is provided, the air is forced through an optimal flow path, through each drone 110, and throughout the entire drone stack 105. In some alternative embodiments, air is blown generally at hot components to help cooling, but as will be appreciated, this is far from optimized as the bulk of the airflow won't come into contact with the hot components.

In a preferred embodiment of the invention, there is provided an independent, low-power, highly reliable radio link used for backup communications to the main high-bandwidth radio communications channel to the drones. This independent radio link enables power control of drones 110. If drones 110 are deployed or even in the case, this low-power radio can stay on, listening for a power-on signal from the Ground Control Station (GCS). Depending on factory or user configuration settings, this power-on signal will in some instances be configured to activate an individual drone and in other instances be configured to activate a selected group of drones simultaneously. The change in configuration will in some embodiments be user-selected during real time usage. In the preferred embodiment, this signal can also be used to power off drones 110 to save power and reduce heat load during warm weather. Preferably, this radio circuit is designed to use low power and be independent of the main controller circuit to eliminate the chances of accidental power-on. In the preferred embodiment, this independent circuit is also used a safety backup in the case a drone has a hardware or software failure. The GCS can monitor and kill potentially unresponsive drones via this independent radio link, or, alternatively or additionally, an operator is enabled to manually terminate one or many drones via this independent radio link. In these embodiments that incorporate this independent radio link, instead of completely relying on a computer with a complex operating system that can crash or disconnect from the network at any time, a human operator will in some embodiments be provided with an independent safety controller box that is equipped with an emergency stop and/or arm/disarm physical buttons, coupled to drones 110 via a dedicated radio link. In such embodiments, this hardware is preferably provided with physical buttons to arm/disarm the show and Emergency-Stop the show if needed. In some embodiments, a positive verification control methodology is used in the case of a failure. In some of these embodiments, a positive E-Stop signal is required by the drone to go into an Emergency Stop state. If no signal is seen, it may indicate a hardware failure, not an actual Emergency event. This radio circuit is a backup to the GCS with its own dedicated power system, so the likelihood of a GCS and independent safety controller failure is highly unlikely. In other words, if one ground hardware link fails, it doesn't stop the show.

In accord with a preferred embodiment drone storage and launch method, drones 110 are automatically deployed and restacked. As described herein above, in much of the prior art a drone operator will measure out ground positions, creating a grid for each drone to be manually placed. Instead, in accord with the present invention an automatic waypoint grid is automatically generated, for exemplary and non-limiting purpose based off the RTK corrections base station, usually with the base station being the center point. This eliminates the need for operators to measure out and mark individual drone placement in grids or other patterns, which can take hours. Once drones are powered up, they can be inspected by an operator, placed nearby and then automatically flown to the auto-generated grid point the drone has been allocated to. This saves operators time by not having to walk out and place the drones manually. This initial auto positioning flight can also be used as a pre-flight check to evaluate airworthiness of the drone before flying the main mission. This pre-mission individual-drone safety flight can be evaluated in some embodiments manually by the drone pilot, and in some embodiments by the GCS automatically looking for any anomalous behavior. The pre-mission individual-drone safety flight in some embodiments will be conducted on one drone 110 at a time, and in other embodiments on a plurality of drones 110 simultaneously. Once deployed to their allocated positions, the drones 110 can be remotely powered off by the GCS to save power and alleviate heat buildup while waiting for the mission. They can be powered back on either via a timer set to turn on before the show or via the aforementioned low-power radio that listen for a dedicated signal from the ground station. As can be appreciated then, in accordance with this method drones 110 are moved to a ground location and then flown to their allocated grid (or other) position while being observed for airworthiness. From there, drones 110 are deployed for the mission.

For an even greater level of automation and time savings, drones 110 can be configured to take off from the stack automatically, one after another. In accord with one preferred method, after an operator powers on the top drone, the top drone sends a power-on pulse through the charge pins to power on the other drones. This pulse cascades through to each drone, not all at once, which allows to the ground control station (GCS) to automatically and dynamically determine the stack order of the drones. This then allows the ground control station to determine actual stack order, in the case an operator or other person swapped a few drones in the stack. Stack order is in one embodiment determined by a drone 110 booting up, and then establishing comms with the GCS. In another embodiment, stack order is determined through GPS determination. Once this happens, that drone will then power up the next drone in the stack, such as for exemplary and non-limiting purpose by sending a pulse through the through-stack electrical connectors 120. In alternative embodiments, drones 110 are configured to apply a slight delay to the next drone power on signal, so the GCS can determine stack order by the order it conducts drone comms. Other apparatus may be used to initiate or propagate the power-on signal, for exemplary and non-limiting purpose such as buttons, wireless transmission, light transmission, other drones or control apparatus, etc. The stack pulse can also be used to power off drone stack 105.

Preferably, drones 110 are designed and configured to obtain a high-precision GPS position determination such as an RTK GPS position fix while in the stacked configuration using certain types of antennas and ideal placement. While GPS is specified herein, it will be understood herein and throughout the present disclosure to include GPS, GNSS, Ultra Wide Band (UWB), and other radiowave, lightwave, or any other equivalent or suitable alternative location determination systems. Automatic stack deployment can be executed while drone stack 105 is in the transport and storage case or with stack 105 removed and placed outside of the case. In addition, a plurality of stacks 105 may be launching drones 110 at the same time. In some embodiments, drone stacks 105 are a part of a permanent or semi-permanent installation where they are configured to be fixed down, connected to permanent power and have some form of weather protection such as an opening roof or garage door.

In some applications, a pre-mission safety flight will not be required. In such instances, and at a yet greater level of automation, drones 110 are configured to fly directly from a stack 105 into their mission.

As also described herein above, in much of the prior art when a mission is completed, a human operator will place drones individually back into a storage/charging case. In accord with a preferred embodiment drone storage and launch method, drones 110 are automatically restacked by automatically landing back into a case. As described herein above, most preferably cup-shaped base 114 and hat shaped drone core cap 116 have an interlocking geometry that also has "locating" features such as tapers that funnel drones 110 down into coaxial location within a vertical axis stack. While the geometries illustrated are preferred and exemplary, those skilled in the mechanical arts will recognize a plethora of alternative geometries that are known to provide like benefit and similar function. In embodiments having these locating features, a drone with a flight accuracy of ~100 mm can drop onto the stack base or previous drone and slide into a far more precise location of a few millimeters. Such locating features also allows easy manual stacking of drones, just by manually dropping them near their location and allowing gravity to do the rest. This also facilitates easy location for automatic RTK GPS or equivalent or alternative guided landings back onto the stack for massive time savings. Preferably, the locating features provide precise X and Y location, understood herein to be in a horizontal plane generally parallel to the ground, along with rotation about the z-axis, or vertical axis. As gravity pulls the drone 110 down, the locating features guide a drone's x-position, y-position and z-rotation down to a hard stop. This allows precise location for charging/comms contacts. These locating features in some embodiments are also configured to lock a drone stack 105 together as long as a force is applied to both ends of the stack for easy manual transport.

While the foregoing details what is felt to be the preferred embodiment of the invention, no material limitations to the scope of the claimed invention are intended. For exemplary and non-limiting purpose, while a GCS is discussed herein above, control may be instead distributed within the drones themselves or through other techniques. As may be appreciated, there are too many such variants to individually list. Consequently, features and design alternatives that would be obvious to one of ordinary skill in the art are considered to be incorporated herein. The scope of the invention is set forth and particularly described in the claims herein below.

We claim:

1. An automatic drone storage and launch system, comprising:

a first vertical stack of drones defining a first vertical axis, individual ones of said first vertical stack of drones having propeller arms; and a second vertical stack of drones having propeller arms defining a second vertical axis adjacent to, parallel with, and displaced from said first vertical axis, individual ones of said second vertical stack of drones having propeller arms, said second vertical stack of drones propeller arms overlapping with and interspersed with neighboring first vertical stack of drones propeller arms.

2. The automatic drone storage and launch system of claim 1, wherein at least one drone in a one of said first and second vertical stack of drones is configured to obtain a high-precision GPS position determination while in said one of said first and second vertical stack of drones.

3. The automatic drone storage and launch system of claim 1, wherein said drones in said first and second vertical stack of drones each further comprise legs configured to support a drone upon an underlying support;

wherein said propeller arms each further comprise propellers extending therefrom; and wherein said propellers of said drones in said first and second vertical stack of drones are configured to rotate into stopping contact with said legs when rotary power is applied to said propellers.

4. The automatic drone storage and launch system of claim 3, wherein said rotary power is energized through an electrical control, and responsive thereto, said propellers of said drones in said first and second vertical stack of drones are retracted against said legs.

5. The automatic drone storage and launch system of claim 1, wherein said drones in said first and second vertical stack of drones further comprise interlocking features that secure said first and second vertical stack of drones together.

\* \* \* \* \*